Patented Dec. 1, 1925.

1,563,713

UNITED STATES PATENT OFFICE.

GEORGE WILSON ACHESON, OF CALDWELL, NEW JERSEY.

PROCESS OF MAKING A REFLOCCULATED PRODUCT.

No Drawing.   Application filed November 22, 1924. Serial No. 751,688.

*To all whom it may concern:*

Be it known that I, GEORGE WILSON ACHESON, a citizen of the United States, residing at Caldwell, in the county of Essex and State of New Jersey, have invented certain new and useful Improvements in Processes of Making a Reflocculated Product, of which the following is a specification.

Compositions prepared by subjecting clay, carbon black, graphite, fuller's earth, amorphous siliceous materials and the like to deflocculation followed by reflocculation, with subsequent drying or calcination according to the use for which the product is intended, have acquired considerable importance in a number of arts, being used for example in the manufacture of crucibles and the like; as fillers for soap, rubber compositions, etc.; and more recently as solid adsorbents in the refining and decolorization of hydrocarbon oils and other bitumens. Certain applications of the product for the last mentioned purpose are disclosed in my copending applications, Serial Number 732,112, filed August 14, 1924, and Serial Number 742,429, filed October 8, 1924. The present invention is a simple and relatively inexpensive process of making such reflocculated products.

Certain prior processes of preparing a reflocculated product are disclosed in the patents to E. G. Acheson, Nos. 1,456,111 and 1,456,112, patented May 22, 1923. As more fully explained in the aforesaid Patent 1,456,112, the term "deflocculation" is employed herein to indicate a subdivision of matter brought about through the agency of certain organic bodies known in this art as "deflocculating agents". When such deflocculating agents are incorporated with the body to be deflocculated, the latter in presence of a sufficiently restricted body of water or other liquid, and the resulting heavy paste is subjected to prolonged mechanical working, the component particles, or a portion of them, undergo deflocculation with the result that they are subdivided into extremely minute masses, which in some cases at least are now believed to be of molecular dimensions. Such deflocculated particles are beyond the limits of visibility under ordinary microscopic observation, but appear under the ultra-microscope as brilliant points in intense vibratory movement. Processes of deflocculation and deflocculating agents for use in connection therewith are disclosed in many prior patents to E. G. Acheson, among which may be mentioned U. S. 1,223,350 of April 24, 1917, as disclosing a preferred mechanical method of effecting the deflocculation; U. S. 1,253,556 of January 15, 1918, and 1,345,305 of June 29, 1920, as disclosing preferred deflocculating agents; and U. S. 1,345,306 of June 29, 1920, as disclosing the preferred moisture relations, in the deflocculating process. However the deflocculation may be accomplished, the deflocculated or colloidal particles may be precipitated from their solution or suspension (reflocculated) by the addition of small proportions of electrolytes such as hydrochloric acid, alum or the like. The particles are thereby precipitated in the form of fragile and porous aggregates, which present enormous surfaces relative to their weight.

When the reflocculated product is to be employed as a solid adsorbent, as for the refining of oils, it is preferably subjected to calcination at high temperatures, of the order of 550°–650° C. under strongly oxidizing conditions, and thereafter reduced by crushing, grinding, sieving, etc., to a state of subdivision appropriate for the intended use.

According to the present invention in its preferred embodiment the desired raw material, as for example china clay or fuller's earth, is first subjected to deflocculation under known conditions, as described in the patents to E. G. Acheson above mentioned, the moisture content being maintained, during the deflocculating run, somewhat below the saturation point as disclosed in the Acheson Patent 1,345,306. For English china clay a moisture content approximating 28% is suitable at this point.

Under the prior practice it has been customary to discharge the contents of the deflocculating mill into water, suspending therein both the deflocculated and non-deflocculated portions, and to precipitate the former by addition of electrolyte, the deflocculated particles being precipitated either upon the non-deflocculated particles, or after being floated therefrom, according to the characteristics desired in the product, the reflocculated material being then collected in a filter press. In contradistinction to this, I effect the reflocculation in the same or other mill, while continuing the operation of attrition, increasing the moisture content as required to maintain the paste consistency of the charge.

For example, I may proceed as follows in treating English china clay: The charge is deflocculated as usual at a moisture content of about 28%. At the conclusion of the deflocculating run the moisture content is raised slowly to about 40%, whereupon an electrolyte is added and the run continued until the reflocculation is complete. During this latter period the charge continually thickens, provided no further moisture is added. As a modified procedure, I may add the moisture continuously or at intervals during the reflocculation period, under conditions to maintain at all times a suitable working consistency in the paste.

When reflocculation is complete the paste is removed from the mill and either air-dried or oven-dried; and is thereafter calcined if desired, the temperature of calcination being appropriate to the particular material used and to the purpose for which it is intended. As a rule calcination is only required when the adsorbent properties of the product are to be utilized. The product is then crushed, ground and screened and is ready for use.

I claim:—

1. Process of making a reflocculated product, comprising subjecting a finely divided solid to successive deflocculation and reflocculation under attrition.

2. Process of making a reflocculated product, comprising subjecting a finely divided solid in paste form to successive deflocculation and reflocculation under attrition.

3. In a process of making a reflocculated product, the step comprising subjecting a deflocculated material to attrition in presence of an electrolyte, to effect reflocculation thereof.

4. In a process of making a reflocculated product, the step comprising subjecting a deflocculated material in paste form to attrition in presence of an electrolyte, to effect reflocculation thereof.

In testimony whereof, I affix my signature.

GEORGE WILSON ACHESON.